W. F. Ketchum.
Mower
Patented Jul. 10, 1847
Nº 238
Reissued Apr. 26, 1853.
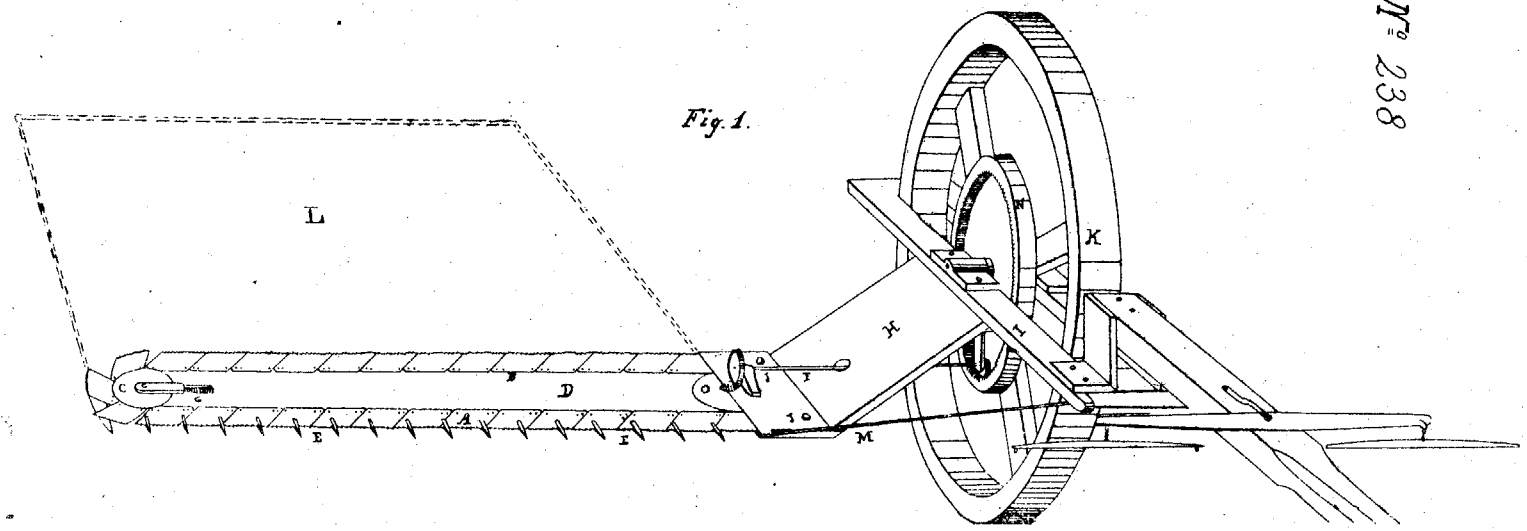
Fig. 1.
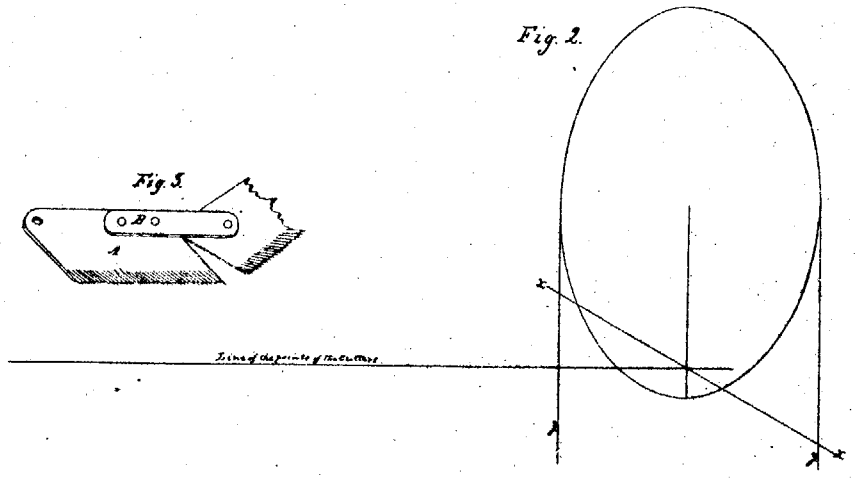
Fig. 2.
Fig. 3.

UNITED STATES PATENT OFFICE.

WILLIAM F. KETCHUM, OF BUFFALO, NEW YORK.

IMPROVEMENT IN REAPING-MACHINES.

Specification forming part of Letters Patent No. 5,189, dated July 10, 1847; Reissue No. 206, dated October 21, 1851; Reissue No. 228, dated January 11, 1853; Reissue No. 238, dated April 26, 1853.

*To all whom it may concern:*

Be it known that I, WILLIAM F. KETCHUM, of Buffalo, in the county of Erie and State of New York, have invented a new, useful, and Improved Grass and Grain Harvester; and I do hereby declare that the following is a full, clear, and exact description thereof, reference being had to the accompanying drawings and letters marked thereon, forming a part of this specification.

Of said drawings, Figure 1 is an isometrical view; Fig. 2, a diagram showing the relative position of the cutters to the driving-wheel, and Fig. 3 a separate view of two of the links of the sickle-edge cutters.

My invention consists, first, in connecting the cutter-bar to the frame of the machine in such a manner as to bring it parallel with and close to the surface of the ground and at a convenient distance from the wheel whatever may be the diameter of the driving-wheel or height of the main frame, so as to cut closely and prevent the loose and cut grass lying between the heel of the cutters and driving-wheel from clogging the cutters or retarding the free passage of the machine over the ground; second, in placing the line of the cutters in or nearly in the same vertical plane with the axis on which the frame swings, so that the vibrations of the frame on uneven ground shall not materially elevate or depress the cutters, which desideratum cannot be attained if the cutters occupy a position remote from said plane; and, third, in an endless-chain cutter consisting of a series of serrated or sickled edge cutters linked together, and the application and arrangement of it in such a way as causes it to run around pulleys with the back of the cutters against the pulleys, the pulleys having their bearings in the cutter-bar, and the cutters being covered all over except their cutting-edges.

In said drawings, H is a crooked arm or coupling-piece. It may be made of cast or wrought metal. One end of it is fastened permanently to the frame I in any well-known manner and at any part thereof so as to bring the cutters in the desired position above stated, and the other end has a sort of open mortise in it, in which the cutter-bar is fastened by bolts J J.

It (the coupling-piece) should be long enough to allow the cutters to swing the proper distance from the surface of the ground, and it should be so constructed as to be at about the angle to the cutters and frame represented in the drawings, so that it will pass freely over the loose and cut grass lying between the heel of the cutters and the driving-wheel, and the cutter-bar or line of cutters should be in nearly the same vertical plane with the axis. Thus it will be seen that with this arrangement and attachment of the cutter's bar with the frame the cutters are always parallel with and close to the surface of the ground, although the surface of the ground may be irregular and the center of the driving-wheel elevated two or more feet. The elevation of the cutters from the ground must under all circumstances be substantially the same, for as the driving-wheel passes over the elevated and depressed portions of the ground the cutters will be elevated and depressed accordingly.

It is obvious that any skillful mechanic may devise numerous ways of fixing the cutter-bar in the same position relatively to the wheel and frame, but all these would involve the same principle and improvement.

The endless belt of cutters, as seen at A, is made of iron or steel segments or pieces about three or four inches long and connected together by lapping the longest pieces on top of the short pieces, (seen at B, Fig. 3.) The ends of the longest pieces meet in the center of the short pieces, and the short pieces are riveted fast with two rivets at one end, and the other end is riveted to the other long piece with one rivet, which is the joint or pivot on which the pieces work or turn. The inner corners of the longest pieces are rounded off, so that the belt may bend or work around the pulleys, (seen at *c c*.) The belt of the cutters is placed on the rack-piece D flatwise and around the pulleys edgewise, or, rather, the back part of the cutter is against the pulleys and the cutting-edge projecting from them between the rack-teeth. The rack-teeth are fastened to the rack under the belt of cutters, and are seen at E E projecting out in front of the cutting-edge. The inner corners of the longest pieces or segments of the belt of cutters being rounded allows the belt to yield and work around the pulleys edgewise. The pulley nearest the driving-wheel is propelled by cogs on the shaft F, which shaft is propelled by the main cog-wheel, (seen at N.)

The other pulley yields to the uneven surface of the belt by a spring, G, bearing against its boxing.

Having thus fully described my improvements, what I claim as my invention, and desire to secure by Letters Patent, is—

1. Placing the cutter-bar and cutters lower than the frame of the machine and opposite the side of the plane of the wheel in such a manner as to leave unobstructed space below the frame, and also between the wheel and the cutters with their supports, to allow the machine to pass freely and without clogging over the cut grass or grain, as set forth.

2. Placing the cutters lower than the frame and axle and in or nearly in the same vertical plane with the axle on which the frame hangs and vibrates and parallel, or nearly so, to said axle, so that the vibrations of the frame on uneven ground shall not materially elevate or depress the cutters, as herein set forth.

3. The endless chain of cutters, in combination with the guard-teeth, operating substantially as described.

WILLIAM F. KETCHUM.

Witnesses:

H. B. BURT,

B. R. SMITH.